(12) United States Patent
Edlinger

(10) Patent No.: US 8,361,187 B2
(45) Date of Patent: Jan. 29, 2013

(54) METHOD FOR REDUCING OXIDIC SLAGS AND DUSTS USING INDUCTIVELY HEATED FURNACE

(75) Inventor: Alfred Edlinger, Bartholomäberg (AT)

(73) Assignee: SGL Carbon SE, Wiesbaden (DE)

( * ) Notice: Subject to any disclaimer, the term of this patent is extended or adjusted under 35 U.S.C. 154(b) by 0 days.

(21) Appl. No.: 13/066,639

(22) Filed: Apr. 20, 2011

(65) Prior Publication Data

US 2011/0197707 A1    Aug. 18, 2011

Related U.S. Application Data

(62) Division of application No. 12/448,958, filed as application No. PCT/AT2007/000556 on Dec. 10, 2007, now Pat. No. 7,976,771.

(30) Foreign Application Priority Data

Jan. 19, 2007 (AT) .................................. GM35/2007
May 22, 2007 (AT) ................................ GM330/2007

(51) Int. Cl.
*C22B 7/02* (2006.01)
*C22B 7/04* (2006.01)

(52) U.S. Cl. ....... 75/10.14; 75/10.29; 75/10.3; 75/10.46
(58) Field of Classification Search ................. 75/10.14, 75/10.29, 10.3, 10.46
See application file for complete search history.

(56) References Cited

U.S. PATENT DOCUMENTS

| 3,948,640 A * | 4/1976 | Elvander et al. ............. 75/10.17 |
|---|---|---|
| 5,304,230 A | 4/1994 | Steins et al. |
| 5,479,436 A | 12/1995 | Hashida et al. |
| 5,601,625 A | 2/1997 | Ulrich |
| 5,757,843 A | 5/1998 | Otsuka et al. |
| 2005/0138964 A1 | 6/2005 | Edlinger |
| 2009/0266200 A1 | 10/2009 | Edlinger |

FOREIGN PATENT DOCUMENTS

| AT | 351 001 | 7/1979 |
|---|---|---|
| DE | 26 20 462 A1 | 11/1977 |
| DE | 195 25 389 A1 | 1/1996 |
| EP | 0 539 352 A1 | 4/1993 |
| EP | 0 661 507 A1 | 7/1995 |
| GB | 2 247 305 A | 2/1992 |
| WO | WO 03/070651 A1 | 8/2003 |
| WO | WO 2006/079132 A1 | 8/2006 |

* cited by examiner

*Primary Examiner* — George Wyszomierski
*Assistant Examiner* — Tima M McGuthry Banks
(74) *Attorney, Agent, or Firm* — Chapman and Cutler LLP

(57) ABSTRACT

A method for reducing oxidic slags and dusts possibly loaded with organics uses an inductively heatable coke bed extending in the axial direction and having a temperature gradient. Reaction gas is sucked off in an axial region of the coke bed between two induction bodies and metal regulus and slag melt are tapped on the lower end. An inductively heatable shaft furnace chargeable with a lumpy coke bed for the reduction of metallic slags is made of an electrically insulating refractory material, has an adjustable temperature gradient includes at least one cooled induction body on the head side, a suction connection in an axial region where the prevailing temperature exceeds the condensation point of the substances to be removed, located below the cooled induction body on the head side, and an opening for tapping metal regulus and slag melt is provided on the lower end of the furnace.

4 Claims, 3 Drawing Sheets

METHOD FOR REDUCING OXIDIC SLAGS AND DUSTS USING INDUCTIVELY HEATED FURNACE

This application is a divisional of application Ser. No. 12/448,958 filed Aug. 7, 2009, now U.S. Pat. No. 7,976,771, which is a §371 of PCT/AT2007/000556 filed Dec. 10, 2007, claiming priority from Austrian Pat. App. No. GM 35/2007, filed Jan. 19, 2007, and No. GM 330/2007, filed May 22, 2007, all of which are incorporated herein by reference. The invention relates to a method for reducing oxidic slags and dusts possibly loaded with organics and also having very high contents of chromium and vanadium slags (e.g. stainless steel slags), using an inductively heatable coke bed extending in the axial direction and having a temperature gradient, and to an inductively heatable shaft furnace chargeable with a lumpy coke bed, for the reduction of metallic slags possibly loaded with organics and made of an electrically insulating refractory material, in which a temperature gradient is adjustable, including at least two independently controllable, cooled induction bodies arranged in different axial regions of the shaft furnace.

BACKGROUND OF THE INVENTION

WO 2006/079132 A1 already proposed a method for reducing metal-oxide-containing slags or glasses and/or degassing mineral melts and the respective device for carrying out that method, in which the molten slags were charged onto an inductively heated coke bed, wherein the charge was supplied to a substantially closed shaft reactor and the coke bed was inductively heated to temperatures that were to safeguard that a melt would form as far as to the tap end or the melting temperature would be maintained. In that known device, oxygen was injected in different axial sections of the furnace and the shaft furnace was inductively heated in different sections at different frequencies and with different energies. In that known device, the redox potential of the bed or column could be controlled by the blowing-in of gases, wherein the known device comprised axially consecutive sections equipped with separate temperature measuring means and/or electric power input measuring means in order to thereby ensure an appropriate control of the temperature in the individual sections. It was essential for the known device that the electric energy was directly introduced into the coke bed, wherein the walls or housing themselves were made of refractory material, which was not heated when applying electric energy and, hence, configured in an insulating manner over that temperature range which was to be expected in the region of the housing walls. The housing itself was designed to be cooled just as the induction bodies or induction coils, since the induction heat was actually secured by the accordingly conductive coke particles.

The invention aims to further develop a method and device of the initially defined kind to the effect that any charging materials like zinc-coated scrap, shredder light fraction, rolling mill scales loaded with organics, zinc-containing dusts, sewage sludge combustions ashes possibly containing $P_2O_5$, $Fe_2O_3$, CaO, $Al_2O_3$, ZnO etc., and electric scrap can be processed in a simple manner and noxious substances can be drawn off nearly quantitatively without forming internal circulations. The invention, furthermore, serves to perform the method in a manner that the closed configuration of a cupola furnace can be obviated and a simple shaft having an open, cold charging end can be employed without having to fear the escape of noxious substances there. By the known use of insulating materials for the refractory lining and/or shell of the shaft, it is to be ensured again that the electric energy will merely take effect in the region of the coke bed.

BRIEF SUMMARY OF THE INVENTION

To solve this object, the method according to the invention, departing from the initially defined method, essentially consists in that reaction gas is sucked off in at least one axial region of the coke bed below a head-side induction body capable of bringing the coke bed to carbon ignition temperature, and that the metal regulus and the slag melt are tapped on the lower end of the coke bed. By the reaction gas being sucked off in an axial region of the coke bed between two induction bodies, and the metal regulus and the slag melt being tapped on the lower end of the coke bed, a gas conduction will be achieved in the interior of the coke column, by which, departing from the cold charging end, reaction gases will be sucked towards the suction opening and hence conducted in co-current with the charge in a first axial section, whereas a further partial amount of the reaction gases will also be sucked towards the suction opening from the hot tap end such that the gases will be conducted in counter-current to the melt in this second axial section of the coke bed or coke column. Such gas conduction offers the advantage that the portion of highly viscous hot gases will be substantially reduced and the gases still formed in the region of the tap end will be able to dissipate their sensible heat in counter-current to the descending melt. The region below said induction body is thus characterized by a temperature lower than the temperature of the coke bed on the tap end, yet, on the other hand, clearly higher than the gas temperature on the cold charging end, so that a suitable selection of the position of the suction opening will, in fact, safeguard in every point that gases loaded with noxious substances will be reliably sucked off without forming new circulations in the interior of the shaft furnace or coke bed, respectively.

The method is advantageously performed in a manner that the temperature at which the reaction gas is drawn off while applying a negative pressure lies above the condensation point of the noxious substances to be removed and, in particular, above 910° C. A temperature of above 910° C. is selected in view of the zinc vapors, whose condensation point is at 907° C. under atmospheric pressure. If only phosphorus vapor is present as a noxious substance, the suction temperature may be chosen accordingly lower and above 290° C. The suction opening in this case is put under a slight negative pressure, whereby phosphorous vapor can also be sucked off in addition to zinc vapor. The appropriate adjustment of the temperature at which the removal by suction takes place allows for the selective suction of a number of noxious substances so as to substantially increase the number of possible charges, since it has now become feasible to appropriately reprocess even hazardous materials containing zinc, carbon, hydrocarbons, alkalis, halogens, lead, cadmium, mercury or organic pyrolysis products. Solid wastes, in particular, mostly have high portions of volatile substances when thermally pretreated, among which volatile substances, in addition to the metal vapors mentioned, zinc and cadmium condensations, alkali halogens and tar condensation, above all, are to be classed as problematic in shaft furnaces, leading to undesired circulations. The removal by suction according to the invention has now enabled the unproblematic realization of such pyrometallurgical refining in a shaft furnace, with the gas withdrawal basically having to be in the range above the condensation temperature of the respectively relevant volatile noxious substances. Coke and gas preheating to the respective target temperature is effected in the co-current region, i.e. in the region in which the charge and the gases are conducted in the same direction through the coke bed. Only the further melt reduction is subsequently performed in the counter-current region, this common gas withdrawal for the two regions preventing the formation of an internal circulation.

The withdrawn reaction gas may preferably be supplied to a gas reformer, in which zinc is, for instance, reacted with water vapor to form zinc oxide and $H_2$, thus enabling the formation of an accordingly purified and cooled gas having a high calorific value.

The different axial sections of the coke bed or coke column may preferably be operated in a manner that the head-side induction body is operated at a frequency of 20-120 kHz and an induction body arranged in the vicinity of the tap end is provided, which is operated at a frequency of 1-10 kHz. In this manner, the fact is taken into account that in the co-current region, in which a reduction does not yet occur to a large extent, the coupling to oxidic components will require higher frequencies than the coupling in the reduction region in which high amounts of metallic melts and coke of higher temperatures are already present, which would couple at lower frequencies. This measure allows for the adaptation of the energy consumption to that actually required in each case. By the aid of the induction coils provided adjacent the tap, inductive overheating to above 1700° C. can be achieved in the case of batches containing chromium and vanadium oxides, thus increasing the reduction potential to values at which $SiO_2$ can be selectively reduced to Si and the Si-content of the metal melts can thus be selectively adjusted.

According to a further preferred mode of operation, it is proceeded in a manner that the suction of the reaction gas is performed from several axially consecutive annular spaces, wherein the suction line pressure of axially consecutive annular spaces is selected to remain substantially constant or increase in the axial direction. In this manner, a fractionated withdrawal of gases at different vapor pressures is feasible, whereby the relatively highest temperature will even allow for the withdrawal of alkali halides to be subsequently washed out of the gas. The successive increase in pressure in the axial direction of the reactor causes the suction performance to decrease in the axial direction such that the respectively more volatile contaminations will be safely drawn off and subsequently reduced metal vapors and valuable substances volatile at higher temperatures, e.g. Zn vapor, will not be sucked off in a manner contaminated with such volatile components.

Advantageously; it may also proceeded in a manner that acidic additives such as, e.g., $SiC_2$ or $Al_2O_3$ are added to the charged slags and dusts to lower the slag basicity, thus enabling a decrease of the slag viscosity as well as the slagging of alkalis.

The device according to the invention for carrying out this method consists in an inductively heatable shaft furnace chargeable with a lumpy coke bed for the reduction of metal-oxidic slags possibly loaded with organics, which is made of an electrically insulating refractory material, in which a temperature gradient is adjustable, including at least one cooled induction body arranged on the head side. A shaft furnace of this type can basically be taken from WO 2006/079132 A1. In accordance with the invention, this configuration now has been further developed to the effect that the shaft furnace comprises a suction connection in an axial region in which the prevailing temperature is above the condensation point of noxious substances to be removed and which is located below the cooled induction body arranged on the head side, and that an opening for tapping the metal regulus and the slag melt is provided on the lower end of the furnace. With such a device, in which the cold charging end may be configured without lid, it is feasible to effect conventional burdening as with a classic cupola furnace, whereby even preheated and calcined material may basically be charged. Charging is, however, effected in solid form and may, in particular, be performed in dust form.

In accordance with the invention, said device is advantageously configured such that the furnace, in the region below the head-side induction body, comprises a region with an enlarged diameter, such a configuration resulting in a smaller structural furnace height while providing an appropriate volume for the counter-current region, in which the melting and reducing process is to be performed. In the transition between the preceding and inductively heated regions of the shaft furnace, an accordingly annular space is formed on the site of enlargement, from which the reaction gases can be discharged in a particularly simple manner, wherein an appropriate suction pressure has to be applied, which is, for instance, produced by a suction blower.

Induction bodies or induction coils to be employed in the context of the invention will, as a rule, require appropriate cooling. The configuration is thus advantageously devised such that the induction bodies are cast into the refractory material of the shaft furnace, in which case the cooling of the induction body will, at the same time, ensure the cooling of the refractory material, optionally under the selective formation of a solid "slag coat" of the shaft furnace, which already may also contain metallized metals. Such cooling is of particular importance to refractory materials, which become electrically conductive at increased temperatures, since the electric energy is to be completely transmitted to the coke column rather than to the lining. These parameters imply that silicon carbide is, for instance, out of the question as a refractory material and that aluminum oxide is to be regarded as particularly preferred, since such a refractory material will keep its electrically insulating property even at high temperatures, as will be the case when selecting magnesium oxide. A number of other refractory materials are characterized by becoming increasingly conductive with increasing temperatures, cooling in those cases being of elementary importance.

In a particularly simple manner, the configuration in this respect is devised such that the induction bodies are designed as coils, wherein the induction bodies may alternatively be designed as slotted collars.

As already mentioned, the configuration according to the invention is advantageously devised such that the cold charging end of the shaft furnace is designed to be open. Gas connection openings, which may serve different purposes, may lead to the periphery of the shaft furnace in different axial regions. In the region of the head-side induction body arranged in the vicinity of the cold charging end, nozzles for flushing the coke bed with oxygen and/or hot blast are advantageously provided, wherein, in a particularly advantageous manner, nozzles for flushing the coke bed with oxygen and/or hot blast are additionally provided near the tap end. An addition of fuel with oxygen may advantageously also take place on this site in order to achieve a decrease of the electric energy demand. Advantageously, even the addition of cheap, Cl containing alternative fuels may be envisaged.

In a particularly advantageous manner, the tap end may be configured as a flooded tap with the coke column floating on the slag/metal melt due to the density difference.

BRIEF DESCRIPTION OF THE DRAWINGS

In the following, the invention will be explained in more detail by way of an exemplary embodiment schematically illustrated in the drawing. Therein.

DETAILED DESCRIPTION OF THE INVENTION

Figure 1:
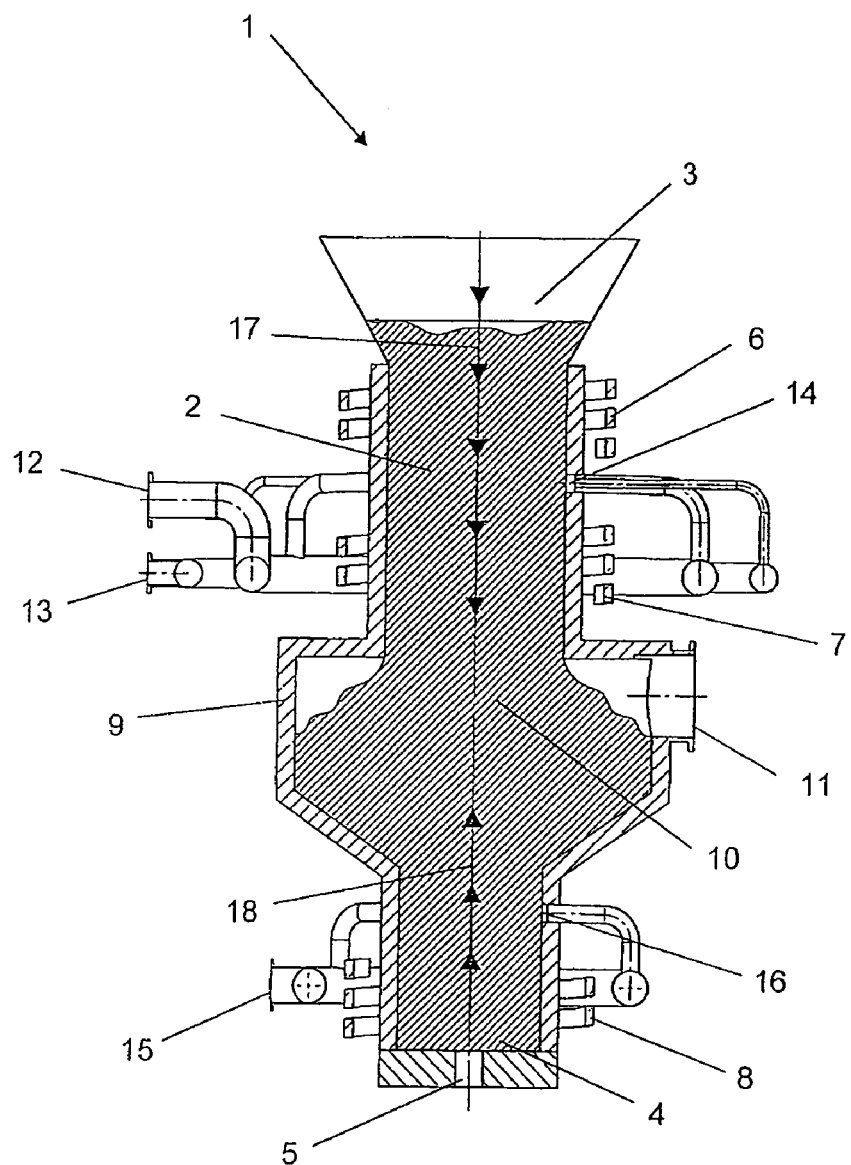
FIG. 1 illustrates a first configuration of the shaft furnace, used according to the invention.

In FIG. 1, a shaft furnace is denoted by 1, in which a coke bed 2 is provided for the reduction of oxidic slags and which includes a cold charging end 3 and a hot tap end 4. On the hot tap end, an opening 5 is provided for tapping the metal regulus and the slag melt. In axial regions of the shaft furnace, induction bodies 6, 7 and 8 are provided, which are independently controllable and serve to inductively heat the coke bed 2. The shell 9 of the shaft furnace is made of electrically insulating, refractory material and, in a region having an enlarged diameter 10, comprises a suction connection 11 through which the noxious substances to be removed can be sucked off. In the region of the head-side induction bodies 6 and 7, the shaft furnace 1 further comprises supply ducts 12 and 13 for supplying nozzles 14 passing through the shell 9 of the shaft furnace 1 with oxygen and/or hot blast for flushing the coke bed 2. Furthermore, a supply duct 15 for oxygen is provided near the tap end 4 to supply nozzles 16 passing through the shell 9 with oxygen and/or hot blast for flushing the coke bed.

Due to the fact that, with the shaft furnace 1 according to the invention for the reduction of oxidic slags, reaction gas is sucked from the region with the enlarged diameter 10 through the suction connection 11 in the axial region between the head-side induction bodies 6 and 7 and the induction body 8 arranged in the vicinity of the hot tap end, the invention provides a gas conduction in the shaft furnace 1 as is schematically indicated by arrows 17, 18, the flow in the charging region being conducted in the same direction as the burden, along arrow 17, and in the region of the tap and towards the suction connection 11 in opposite direction to the burden or melt, along arrows 18.

Figure 2:
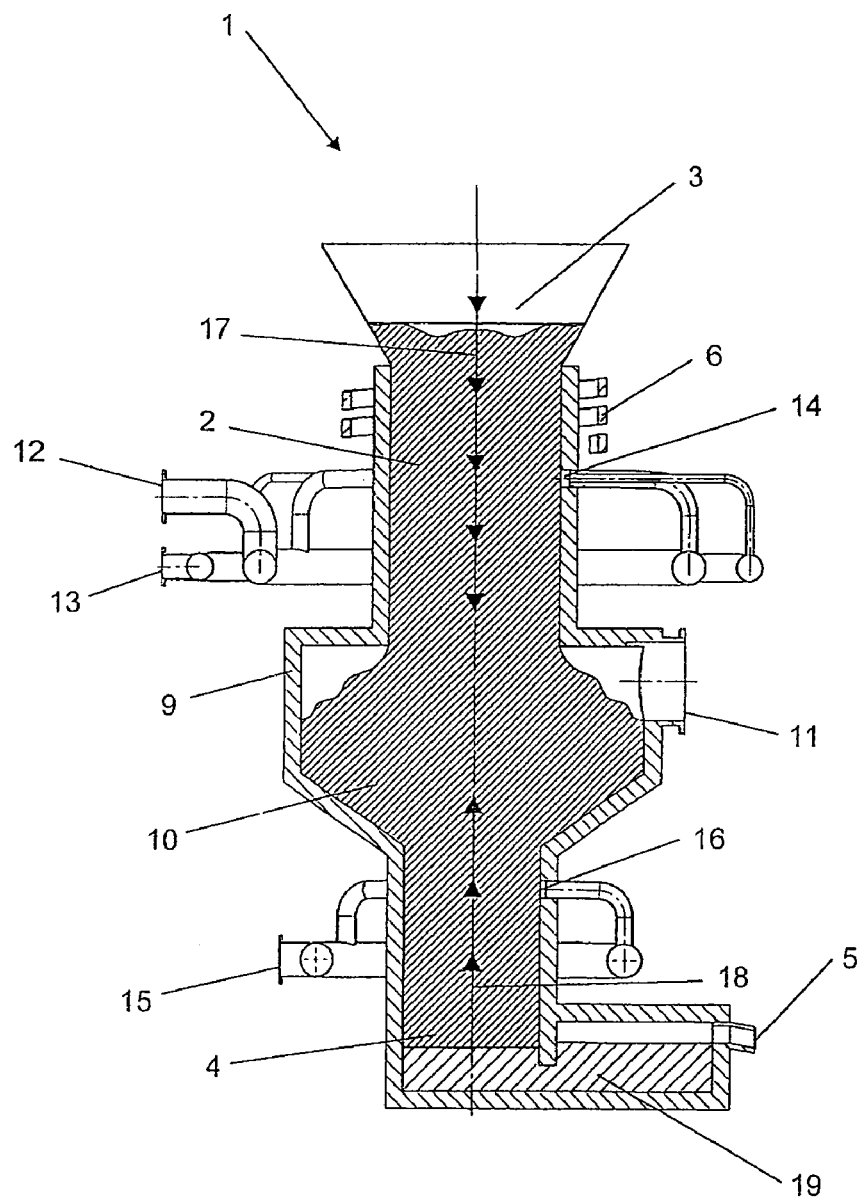
FIG. 2 shows a modified configuration in an analogous illustration.

FIG. 2 depicts a variant of the shaft furnace according to the invention with a flooded tap, similar or identical components bearing the same reference numerals as in FIG. 1. In this variant, no induction bodies are provided in the region neighboring the tap end 4, the control of the temperature gradient in the region below the head-side induction body being merely accomplished by the blowing-in of gases. The inductive heating at the head end is maintained until the formation of coke embers, whereupon the desired melting temperature is adjusted by the aid of oxygen, hot blast or fuels. On the tap end 4, the coke column 2 floats on the slag/metal melt 19, which can be drawn off via the tap opening 5.

Figure 3:
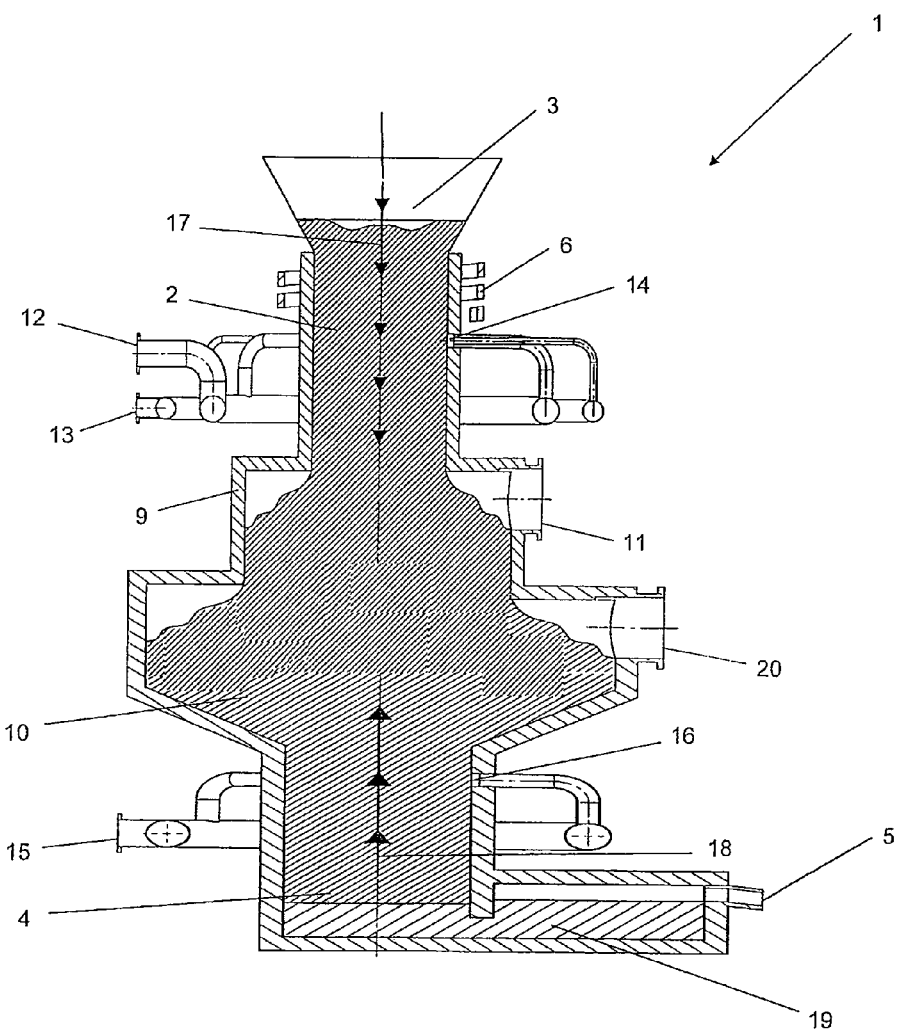
FIG. 3 depicts a modified configuration of the shaft furnace with several suction connections.

FIG. 3 depicts a variant of the shaft furnace according to the invention with a flooded tap, wherein the reference numerals from the preceding Figures have been retained. In this variant, a further suction connection 20 is arranged in the axial direction between the suction connection 11 and the tap-side end of the shaft furnace, which suction connection 20, by a suitable selection of the pressure conditions between the suction connection 11 and the suction connection 20, allows for the fractionated withdrawal of substances at different vapor pressures.

The invention claimed is:

1. A method for reducing oxidic slags and dusts using an inductively heatable coke bed extending in an axial direction and having a temperature gradient, comprising the steps of:
   drawing off reaction as by suction in at least one axial region of the coke bed positioned below a head-side induction body arranged in a vicinity of a cold charging end of the coke bed, wherein said drawing off of the reaction as is performed from two or more axially consecutive annular spaces arranged in the axial direction of the coke bed, and
   tapping a metal regulus and slag melt at a tap end of the coke bed,
   wherein said head-side induction body is operated at a frequency of 20-120 kHz, and a tap-end induction body arranged in a vicinity of the tap end of the coke bed is operated at a frequency of 1-10 kHz.

2. A method for reducing oxidic slags and dusts using an inductively heatable coke bed extending in an axial direction and having a temperature gradient, comprising the steps of:
   drawing off reaction as by suction in at least one axial region of the coke bed positioned below a head-side induction body arranged in a vicinity of a cold charging end of the coke bed, wherein said drawing off of the reaction as is performed from two or more axially consecutive annular spaces arranged in the axial direction of the coke bed, and
   tapping a metal regulus and slag melt at a tap end of the coke bed,
   wherein volatile halides and CO are drawn off from a first one of said annular spaces positioned adjacent the charging end, and metal vapors are drawn off from a second one of said annular spaces.

3. A method according to claim 2, wherein the metal vapors comprise Zn vapor with CO.

4. A method for reducing oxidic slags and dusts using an inductively heatable coke bed extending in an axial direction and having a temperature gradient, comprising the steps of:
   drawing off reaction as by suction in at least one axial region of the coke bed positioned below a head-side induction body arranged in a vicinity of a cold charging end of the coke bed, wherein said drawing off of the reaction as is performed from two or more axially consecutive annular spaces arranged in the axial direction of the coke bed, and
   tapping a metal regulus and slag melt at a tap end of the coke bed,
   further comprising the step of adding acidic additives to the slags and dusts to lower the slag basicity.

* * * * *